United States Patent
Lim et al.

(10) Patent No.: US 9,583,279 B2
(45) Date of Patent: Feb. 28, 2017

(54) SECONDARY BATTERY

(71) Applicant: SAMSUNG SDI CO., LTD., Yongin-si, Gyeonggi-do (KR)

(72) Inventors: Dae-Seop Lim, Yongin-si (KR); Jin-Man Jeoung, Yongin-si (KR); Jung-Woo An, Yongin-si (KR); Jeong-Tae Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 212 days.

(21) Appl. No.: 14/065,362

(22) Filed: Oct. 28, 2013

(65) Prior Publication Data

US 2015/0004473 A1 Jan. 1, 2015

Related U.S. Application Data

(60) Provisional application No. 61/841,789, filed on Jul. 1, 2013.

(51) Int. Cl.
*H01M 10/48* (2006.01)
*H01G 11/50* (2013.01)
(Continued)

(52) U.S. Cl.
CPC .......... *H01G 11/50* (2013.01); *H01M 4/364* (2013.01); *H01M 4/505* (2013.01); *H01M 4/525* (2013.01);
(Continued)

(58) Field of Classification Search
CPC .. H01M 10/0525; H01M 4/364; H01M 4/505; H01M 4/525; H01M 4/5825; H01M 4/587; H01M 10/0587
See application file for complete search history.

(56) References Cited

U.S. PATENT DOCUMENTS 6,746,800 B1 * 6/2004 Sunagawa ............ H01M 4/131
429/218.1
8,119,276 B2 2/2012 Johnson et al.
(Continued)

FOREIGN PATENT DOCUMENTS

EP 1 879 244 A2 1/2008
EP 2 017 911 A1 1/2009
(Continued)

OTHER PUBLICATIONS

EPO Search Report dated Nov. 11, 2014, for corresponding European Patent application 14163617.5, (8 pages).

*Primary Examiner* — Helen O Conley
(74) *Attorney, Agent, or Firm* — Lewis Roca Rothgerber Christie LLP (57) ABSTRACT

A secondary battery including a plurality of electrode assemblies including: a first electrode assembly including a first positive electrode active material; and a secondary electrode assembly including a second positive electrode active material; the first electrode assembly and the second electrode assembly being electrically connected to each other, the first positive electrode active material being different from the second positive electrode active material, and a discharge capacity ratio of the second electrode assembly being in a range of 25% to 80%, based on a total discharge capacity of the first electrode assembly and the second electrode assembly, is disclosed.

17 Claims, 4 Drawing Sheets

(51) Int. Cl.
   *H01M 10/0525*   (2010.01)
   *H01M 4/36*   (2006.01)
   *H01M 4/505*   (2010.01)
   *H01M 4/525*   (2010.01)
   *H01M 4/58*   (2010.01)
   *H01M 4/587*   (2010.01)
   *H01M 10/0587*   (2010.01)
   *H01M 4/02*   (2006.01)

(52) U.S. Cl.
   CPC ......... *H01M 4/587* (2013.01); *H01M 4/5825* (2013.01); *H01M 10/0525* (2013.01); *H01M 10/0587* (2013.01); *H01M 2004/021* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2007/0026312 A1 | 2/2007 | Imachi et al. |
| 2011/0171516 A1 | 7/2011 | Byun et al. |
| 2013/0029224 A1 | 1/2013 | Fusalba et al. |

FOREIGN PATENT DOCUMENTS

| | | | | |
|---|---|---|---|---|
| EP | 2 385 573 A2 | | 11/2011 | |
| FR | 2 927 472 | | 8/2014 | |
| JP | 2000-036325 | * | 2/2000 | ............ H01M 10/40 |
| JP | 2001-110418 | * | 4/2001 | ............. H01M 4/58 |
| JP | 2003-323884 | * | 11/2003 | ............. H01M 4/02 |
| KR | 10-2007-0015039 A | | 2/2007 | |
| KR | 10-2011-0083463 A | | 7/2011 | |
| KR | 10-1183929 B1 | | 9/2012 | |

\* cited by examiner

SECONDARY BATTERY

CROSS-REFERENCE TO RELATED APPLICATION

This application claims priority to and the benefit of U.S. Patent Application No. 61/841,789, filed on Jul. 1, 2013, in the United States Patents and Trademark Office, the entire content of which is incorporated herein by reference.

BACKGROUND

1. Field

One or more embodiments of the present invention relate to a secondary battery.

2. Description of the Related Art

In general, unlike primary batteries that are not designed to be recharged, secondary batteries are rechargeable (i.e., they may be recharged and discharged). According to the type of external device for which the battery power is used, a secondary battery may be used as a single battery, or a plurality of secondary batteries coupled to form a single battery module.

Recently, demand for a high-output and high-capacity battery has increased because batteries are now used in large sized transportation vehicles, such as hybrid cars, as well as used in small-sized electronic devices, such as cell phones and laptop computers.

In order to comply with such demand, batteries having low resistance have been designed by thin-filming an electrode plate, but the material used has material characteristic limits. Thus, methods of mixing active carbon, which can be a capacitor material, with an active material have been developed to overcome the limit of the materials. However, when active carbon with a large specific surface area is used in a battery, high-rate characteristics of the battery may be improved, but a capacity of the battery is lower than a battery formed of a lithium transition metal oxide.

In this regard, a lithium transition metal oxide, such as a lithium cobalt oxide, an oxide having an olivine crystalline structure, or a lithium nickel cobalt manganese oxide, is used. However, when the lithium transition metal oxide is used in a secondary battery for a large-sized transportation vehicle, such as a hybrid car, characteristics of electric power may still be deteriorated because a possibility of heat generation may be too high or a capacity may be too low due to destruction of the structure of the secondary battery when it is overcharged.

SUMMARY

One or more aspects according to embodiments of the present invention are directed toward a secondary battery having improved self-discharge characteristics and lifetime characteristics.

Additional aspects will be set forth in part in the description which follows and, in part, will be apparent from the description, or may be learned by practice of the presented embodiments.

According to one or more embodiments of the present invention, a secondary battery includes a plurality of electrode assemblies including: a first electrode assembly including a first positive electrode active material; and a second electrode assembly including a second positive electrode active material, the first electrode assembly and the second electrode assembly being electrically connected to each other, the first positive electrode active material being different from the second positive electrode active material, and a discharge capacity ratio of the second electrode assembly being in a range of 25% to 80%, based on a total discharge capacity of the first electrode assembly and the second electrode assembly.

A discharge capacity ratio of the second electrode assembly may be in a range of 35% to 75% based on a total discharge capacity of the first electrode assembly and the second electrode assembly.

A ratio of a discharge capacity of the second electrode assembly to a discharge capacity of the first electrode assembly may be in a range of 3:1 to 1:3.

An average voltage of the first positive electrode active material may be different from an average voltage of the second positive electrode active material.

An average voltage of the second positive electrode active material may be lower than an average voltage of the first positive electrode active material.

The second positive electrode active material may include a compound represented by Formula 1 below:

$$Li_xM_yM'_zPO_{4-w}X_w \qquad \text{Formula 1}$$

In Formula 1, $0.5 \leq x \leq 1.5$, $0 < y \leq 1$, $0 \leq z \leq 1$, and $0 \leq w \leq 0.2$;

M may be selected from the group consisting of Fe, Mn, Ni, Co, and combinations thereof;

M' may be selected from the group consisting of Mg, Ca, Sr, Ba, Ti, Zr, Nb, Mo, W, Zn, Al, Si, and combinations thereof; and X may be selected from the group consisting of S, F and a combination thereof.

The first positive electrode active material may be represented by Formula 2 below:

$$Li_aCo_{1-b}M''_cO_{2-d}X'_d \qquad \text{Formula 2}$$

In Formula 2, $0.5 \leq a \leq 1.5$, $0 \leq b \leq 0.5$, $0 \leq c \leq 0.5$, and $0 \leq d \leq 0.5$;

M" may be selected from the group consisting of Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc, Y, rare earth elements, and combinations thereof; and X' may be selected from the group consisting of F, S, P, and combinations thereof.

At least one of the first positive electrode active material and the second electrode active material may further include a third positive electrode active material.

The third positive electrode active material may include active carbon.

The third positive electrode active material may be present in an amount, for example, in a range of 0.1 parts to 10 parts by weight, based on 100 parts by weight of the first positive electrode active material, the second positive electrode active material, or both the first and second positive electrode active materials.

A first positive electrode of the first electrode assembly includes the first positive electrode active material and a second positive electrode of the second electrode assembly includes the second positive electrode active material, and at least one of the first positive electrode and the second positive electrode further includes a conducting agent and a binder.

Each of the first electrode assembly and the second electrode assembly may include a negative electrode active material selected from the group consisting of natural graphite, artificial graphite, soft carbon (e.g., carbon sintered at low temperatures), hard carbon, meso-phase pitch carbides, sintered cokes, and combinations thereof.

Each of the first electrode assembly and the second electrode assembly may include a negative electrode active material including soft carbon heat-treated at a temperature of 1500° C. or lower.

In the secondary battery, the first electrode assembly and the second electrode assembly may be connected in parallel.

The first electrode assembly may include a plurality of first electrode assemblies and the second electrode assembly may include a plurality of second electrode assemblies.

In the secondary battery, the plurality of first electrode assemblies and the plurality of second electrode assemblies may be connected in parallel.

The plurality of first electrode assemblies may be electrically connected to one another in series or parallel, and the plurality of second electrode assemblies may be connected to one another in series or in parallel.

In the secondary battery, the first electrode assemblies may be arranged alternately with the second electrode assemblies.

The lithium secondary battery may be replaced by an organic-based capacitor in other embodiments.

The secondary battery may be used in electric cars, hybrid electric cars, or plug-in hybrid electric cars.

An electric vehicle may include the lithium secondary battery.

A hybrid vehicle may include the lithium secondary battery.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Embodiments of the present invention will now be described more fully hereinafter with reference to the accompanying drawings, in which certain embodiments of the present invention are shown, by way of illustration. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. Thus, the scope of the invention is defined by the appended claims and equivalents thereof. Meanwhile, the terminology used herein is for the purpose of describing certain embodiments only and is not intended to be limiting of all suitable embodiments. As used herein, the singular forms "a," "an" and "the" are intended to include the plural forms as well, unless the context clearly indicates otherwise. Expressions such as "at least one of," when preceding a list of elements, modify the entire list of elements and do not modify the individual elements of the list. Further, the use of "may" when describing embodiments of the present invention refers to "one or more embodiments of the present invention." It will be further understood that the terms "comprises" and/or "comprising" when used in this specification, specify the presence of stated elements, steps, operations, and/or components, but do not preclude the presence or addition of one or more other elements, steps, operations, and/or components. It will be understood that, although the terms first, second, etc. may be used herein to describe various elements, these elements should not be limited by these terms. These terms are only used to distinguish one element from another.

Figure 1:
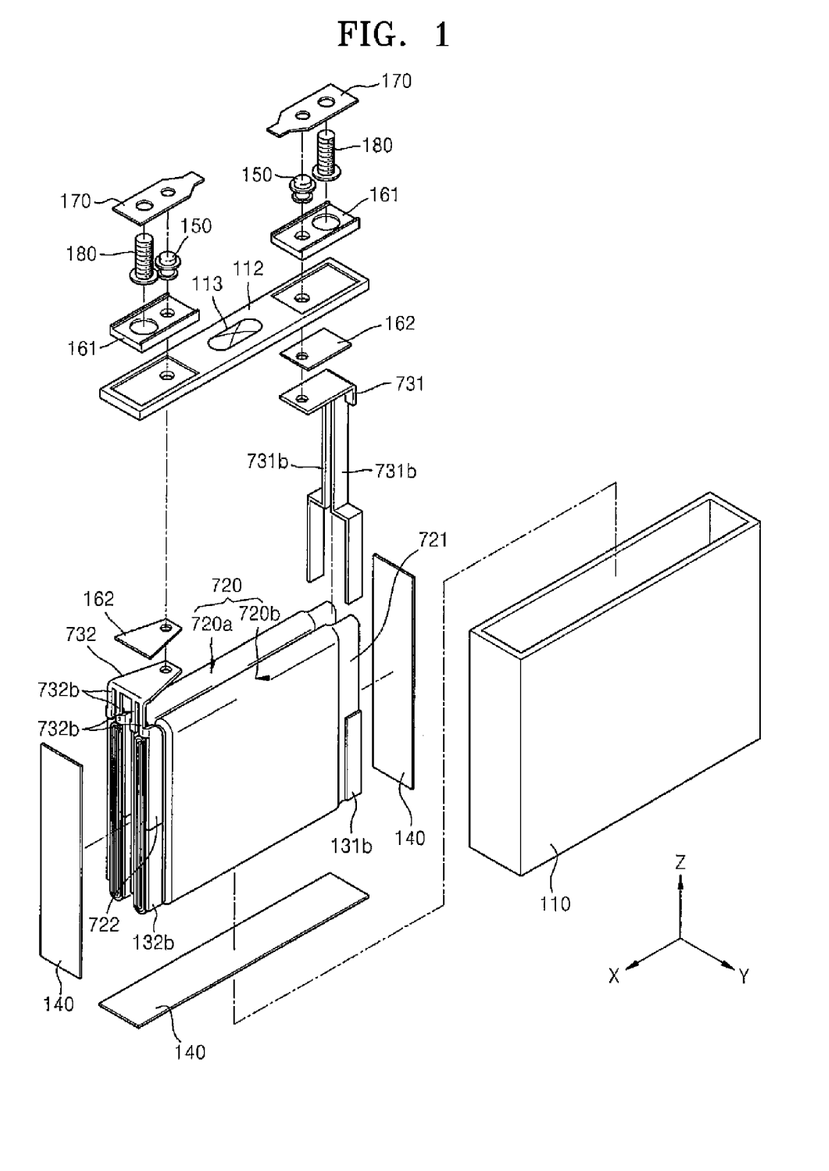
FIG. 1 is a schematic exploded perspective view of a secondary battery according to an embodiment of the present invention.

FIG. 1 is a schematic exploded perspective view of a secondary battery according to an embodiment of the present invention.

Referring to FIG. 1, a secondary battery may include a can 110, in which an electrode assembly 720 and an electrolyte are accommodated, and a cap plate 112 that seals an opening of the can 110, wherein the electrode assembly 720 may include a plurality of electrode assemblies. A secondary battery including the electrode assembly 720 may have an increased output.

The electrode assembly 720 may include a first electrode assembly 720a and a second electrode assembly 720b. The first electrode assembly 720a and the second electrode assembly 720b are respectively connected to a first current collector 731 and a second current collector 732 and may be electrically connected to respective outer terminals 180 through the first current collector 731 and the second current collector 732, respectively. A connection between the first current collector 731 and one of the outer terminals 180 and a connection between the second current collector 732 and another one of the outer terminals 180 may each be formed through a rivet terminal 150 and a conductive plate 170.

For example, in some embodiments, an upper part of the first current collector 731 is bent toward a curved surface, i.e., an upper surface, of the electrode assembly 720, and the bent upper part of the first current collector 731 is connected to a lower part of the rivet terminal 150. An upper part of the rivet terminal 150 passes through the cap plate 112 and may be joined to a hole formed at the conductive plate 170.

Because, the rivet terminal 150 is formed of a conductive metal material, such as, for example, aluminum or an aluminum alloy, the first current collector 731, the rivet terminal 150, the conductive plate 170, and the outer terminal 180 formed at one side of the conductive plate 170 may form a current path.

Here, a seal gasket may be included between the rivet terminal 150 and the cap plate 112 to prevent or reduce leakage of the electrolyte.

In some embodiments, an upper insulator 161 and a lower insulator 162 are respectively disposed on an upper surface and a lower surface of the cap plate 112, so that the first current collector 731 and the conductive plate 170 may be prevented from being electrically connected to the cap plate 112 (or reduce the likelihood of the conductive plate 170 being electrically connected to the cap plate 112). In the present embodiment, the seal gasket may be formed as a unit separate from the lower insulator 162 or may be integrally formed with the lower insulator 162 as one unit.

As described above, the second current collector 732 that is electrically connected to the electrode assembly 720 (e.g., by welding) may be electrically connected to the outer terminal 180 through the rivet terminal 150 and the conductive plate 170 as well.

In the present embodiment, the outer terminal 180 has a bolt shape, but a shape of the outer terminal is not limited thereto. For example, the outer terminal 180 may have a rivet shape.

Meanwhile, the first current collector 731 and the second current collector 732 may have shapes that are different from each other.

For example, the first current collector 731 may include two first lead tabs 731b. Each of the first lead tabs 731b may be electrically connected to a first non-coated portion 721 of the electrode assembly 720, for example, by welding.

The second current collector 732 may include four second lead tabs 732b. Two of the four second lead tabs 732b may be welded while in contact with both side walls of a second non-coated portion 722 of the first electrode assembly 720a, and the remaining two second lead tabs 732b may be welded while in contact with both side walls of a second non-coated portion 722 of the second electrode assembly 720b.

The can 110 may include a conductive metal material, such as aluminum, an aluminum alloy, or steel plated with nickel. The can 110 may be formed in a hexahedron-like shape having an opening to accommodate the electrode assembly 720, but a shape of the can 110 is not limited thereto.

The electrode assembly 720 may include a positive electrode (e.g., a first positive electrode and/or a second positive electrode), a negative electrode (e.g., a first negative electrode and/or a second negative electrode), and a separator disposed between the positive electrode and the negative electrode. The electrode assembly 720 may be rolled to have an overall elliptic-cylindrical shape that has both flat surfaces and curved surfaces. Here, a winding shaft is coaxial with a direction of the x-axis of FIG. 1.

The first and second non-coated portions 721 and 722 are formed at respective ends of the x-axis direction of the electrode assembly 720. The first non-coated portion 721 may be formed at the positive electrode, and the second non-coated portion 722 may be formed at the negative electrode. Alternatively, the first non-coated portion 721 may be formed at the negative electrode, and the second non-coated portion 722 may by formed at the positive electrode.

The electrode assembly 720 is accommodated in the can 110 so that the first and second non-coated portions 721 and 722 are placed at respective sides of the can 110. Here, a retainer 140 may be included at a location corresponding to an inner surface of the can 110 to prevent the electrode assembly 720 from moving undesirably in the can 110 (or to reduce the amount of undesirable movement of the electrode assembly 720 in the can 110).

The electrode assembly 720 and the electrolyte may be accommodated in the can 110, and the opening of the can 110 may be closed by the cap plate 112. The cap plate 112 may be formed of a conductive metal material similarly to the can 110 (e.g., the cap plate 112 may include a conductive metal material that is the same or substantially the same as that of the can 110). A vent 113 may be formed in the cap plate 112. The vent 113 may be integrally formed in the cap plate 112 at a thickness smaller (e.g., thinner) than that of the cap plate 112 so as to be broken when an inner pressure of the can 110 is equal to or greater than a predetermined (or set) pressure. Here, a groove may be formed in at least one of the first and second non-coated portions 721 and 722.

The first and second current collectors 731 and 732 may each include a conductive metal material. In some embodiments, the first current collector 731 may be, for example, a positive electrode current collector and may include aluminum or an aluminum alloy. The second current collector 732 may be, for example, a negative electrode current collector and may include copper or a copper alloy.

The first and second current collectors 731 and 732 are respectively connected to the first and second non-coated portions 721 and 722. In some embodiments, the first and second current collectors 731 and 732 and the electrode assembly 720 may be electrically connected through connections between first and second lead tabs 131b and 132b that are respectively included in the first and second current collector 731 and 732, and the first and second non-coated portions 721 and 722.

As described above, in some embodiments, the electrode assembly 720 is rolled into an elliptic-cylindrical shape that has both flat surfaces and curved surfaces, and thus the first and second non-coated portions 721 and 722 may also have flat surfaces and curved surfaces.

Figure 2:
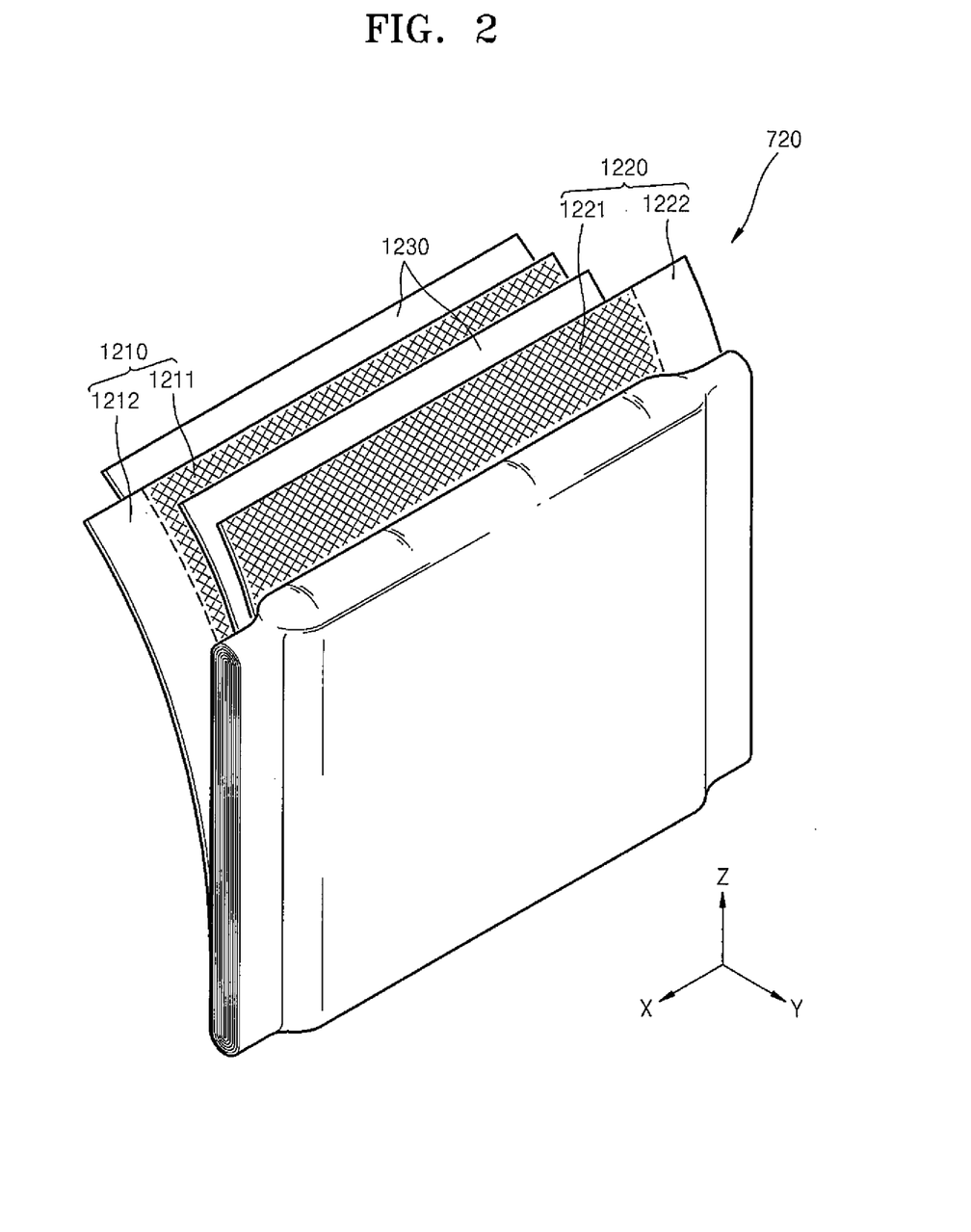
FIG. 2 is a schematic perspective view of an electrode assembly in the secondary battery of FIG. 1.

FIG. 2 is a schematic perspective view of one of the electrode assemblies 720 of FIG. 1.

Referring to FIG. 2, the electrode assembly 720, e.g., the first electrode assembly 720a and/or the second electrode assembly 720b, may be rolled while having a separator 1230 disposed between a positive electrode 1210 and a negative electrode 1220. Here, a first non-coated portion 1212 of the positive electrode 1210 and a second non-coated portion 1222 of the negative electrode 1220 may be disposed in opposite directions from each other (e.g., at opposite sides of the electrode assembly 720).

The positive electrode 1210 may include a first active material unit 1211 and the first non-coated portion 1212, wherein the first active material unit 1211 is coated with a positive electrode active material, and the first non-coated portion 1212 is located at one side of the first active material unit 1211 and not coated with a positive electrode active material (e.g., the first non-coated portion 1212 may be free or substantially free of the positive electrode active material).

The negative electrode 1220 may include a second active material unit 1221 and the second non-coated portion 1222, wherein the second active material unit 1221 is coated with a negative electrode active material, and the second non-coated portion 1222 is located at one side of the second active material unit 1221 and not coated with a negative electrode active material (e.g., the second non-coated portion 1222 may be free or substantially free of the negative electrode active material).

The positive and negative electrodes 1210 and 1220 are wound onto a winding shaft while the separator 1230 is disposed between the first and second active material units 1211 and 1221 and formed in a jelly-roll configuration on the center of a wounded axis such that the positive and negative electrodes 1210 and 1220 overlap each other, and then a pressure is applied to the jelly-roll structure to form the electrode assembly 720 in an elliptic-cylindrical shape having both flat surfaces and curved surfaces.

Here, the first non-coated portion 1212 of the positive electrode 1210 is wound to be overlapped and thus forms the first non-coated portion 1212 of the electrode assembly 720. The second non-coated portion 1222 of the negative electrode 1220 is wound to be overlapped and thus forms the second non-coated portion 1222 of the electrode assembly 720. In each of the first and second non-coated portions 1221 and 1222, a groove may be formed.

According to an aspect according to an embodiment of the present invention, an average voltage of the first positive electrode active material included in the first electrode assembly and an average voltage of the second positive electrode active material included in the second electrode assembly may be different from each other. For example, an average voltage of the second positive electrode active material may be lower than an average voltage of the first positive electrode active material. The average voltages and a total capacity of a secondary battery including the first electrode assembly and the second electrode assembly respectively including the first positive electrode active material and the second positive electrode active material having different average voltages may be appropriately controlled as needed.

A discharge capacity ratio of the second electrode assembly may be in a range of 25% to 80% (e.g., 35% to 80%), based on the total discharge capacity of the first electrode assembly and the second electrode assembly. For example, the discharge capacity of the second electrode assembly may be 25% to 80% of the combined discharge capacity of the first electrode assembly and the second electrode assembly. A discharge capacity ratio of the second electrode assembly may be in a range of 25% to 75% (e.g., 35% to 75%) based on the total discharge capacity of the first electrode assembly and the second electrode assembly. A ratio of a discharge capacity of the second electrode assembly to a discharge capacity of the first electrode assembly may be, for example, in a range of 3:1 to 1:3.

As used herein, "a discharge capacity" refers to "a current amount that can be used for one hour." As used herein, "a discharge capacity of the first electrode assembly" and "a discharge capacity of the second electrode assembly" respectively refer to "a discharge capacity of the first positive electrode active material included in the first electrode assembly" and "a discharge capacity of the second positive electrode active material included in the second electrode assembly."

A secondary battery including the first electrode assembly and the second electrode assembly having a discharge capacity ratio within the foregoing ranges may have improved self-discharge characteristics and lifetime characteristics, and the cost of manufacturing the secondary battery may be reduced.

The second positive electrode active material may include a compound represented by Formula 1 below:

$$Li_xM_yM'_zPO_{4-w}X_w \quad \quad \text{Formula 1}$$

In Formula 1,
$0.5 \leq x \leq 1.5$, $0 < y \leq 1$, $0 \leq z \leq 1$, and $0 \leq w \leq 0.2$;

M is selected from the group consisting of Fe, Mn, Ni, Co, and combinations thereof;

M' is selected from the group consisting of Mg, Ca, Sr, Ba, Ti, Zr, Nb, Mo, W, Zn, Al, Si, and combinations thereof; and X is selected from the group consisting of S, F, and a combination thereof.

The second positive electrode active material may include, for example, an oxide having an olivine structure, for example, $LiFePO_4$. The second positive electrode active material has a flat discharge profile, an excellent stability of structure (e.g., a stable structure), and a little amount of released heat at overcharging, and thus the second positive electrode active material is excellent in terms of high-rate characteristics.

The first positive electrode active material may include a compound represented by Formula 2 below:

$$Li_aCo_{1-b}M''_cO_{2-d}X'_d \quad \quad \text{Formula 2}$$

In Formula 2,
$0.5 \leq a \leq 1.5$, $0 \leq b \leq 0.5$, $0 \leq c \leq 0.5$, and $0 \leq d \leq 0.5$;

M'' is selected from the group consisting of Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc, Y, rare earth elements, and combinations thereof; and X' is selected from the group consisting of F, S, P and combinations thereof.

The first positive electrode active material may include, for example, a lithium cobalt oxide or a lithium nickel cobalt manganese oxide, for example, $LiCoO_2$ or $Li[(Ni_{0.33}Co_{0.33}Mn_{0.33})]O_2$. The first positive electrode active material may be easily manufactured into a device having various suitable forms. An intrinsic density and a pressure density of the first positive electrode active material are high, and thus a capacity per volume is excellent.

At least one of the first positive electrode active material and the second electrode active material may further include a third electrode active material. The third positive electrode active material may include carbon. For example, the carbon may be active carbon (e.g., activated carbon). As used herein, the expression "active carbon" refers to carbon that has been activated (e.g., via physical or chemical activation).

A content of the third positive electrode active material in the first positive electrode active material may be, for example, in a range of 0.1 parts to 10 parts by weight based on 100 parts by weight of the first positive electrode active material. A content of the third positive electrode active material in the second positive electrode active material may be, for example, in a range of 0.1 parts to 10 parts by weight based on 100 parts by weight of the second positive electrode active material. A content of the third positive electrode active material in the first positive electrode active material and the second positive electrode active material may be, for example, in a range of 0.1 part to 10 parts by weight based on 100 parts by weight of the first and second positive electrode active materials. A secondary battery further including the first and/or second electrode assemblies including the third positive electrode active material may have improved high-rate characteristics.

A positive electrode included in the first electrode assembly may further include a conducting agent and a binder in addition to the first positive electrode active material. In particular, the positive electrode may be manufactured by preparing a composition by mixing the first positive electrode active material, conducting agent, and binder with a solvent and then directly coating and drying the composition on a first electrode current collector (or plate). Alternatively, the positive electrode may be manufactured by casting the composition on a separate support to form a film and then laminating the film peeled off from the support on the first electrode current collector.

Examples of the conducting agent may include carbon black, graphite particulates, natural graphite, artificial graphite, acetylene black, ketchen black (or ketjen black), or carbon fibers; metal powder, material fibers, or metal tubes, such as copper, nickel, aluminum, and/or silver tubes; and conductive polymers, such as polyphenylene derivatives, but are not limited thereto, and any suitable material known in the art may be used.

Examples of the binder may include vinylidene fluoride/ hexafluoropropylene copolymers, polyvinylidene fluoride, polyacrylonitrile, polymethylmethacrylate, polytetrafluoroethylene, mixtures of these materials, and styrene butadiene rubber polymers, but are not limited thereto, and any suitable material known in the art may be used. Examples of the solvent may include N-methyl-pyrrolidone (NMP), acetone, and water, but are not limited thereto, and any suitable material known in the art may be used. Here, amounts of the first positive active material, the conducting agent, the binder, and the solvent are similar or substantially similar to amounts generally used in the art.

The positive electrode may further include a general positive electrode active material in addition to a composite positive electrode active material described above. A material that may be used in a positive electrode of the related art and may allow intercalation/deintercalation of lithium may be used as the general positive electrode active material.

A positive electrode included in the second electrode assembly may be manufactured in the same manner as the positive electrode included in the first electrode assembly is manufactured, except that a second positive electrode active material is used instead of the first positive electrode active material, the second positive electrode active material being different from the first positive electrode active material.

A negative electrode may be manufactured in the same manner as the positive electrode of the first or second electrode assembly is manufactured, except that a negative electrode active material is used instead of the first positive electrode active material or the second positive electrode active material. For example, in the same manner of manufacturing the positive electrode as described above, the negative electrode may be manufactured by preparing a negative electrode active material composition by mixing the negative electrode active material with a solvent or mixing the negative electrode active material, conducting agent, binder, and solvent, and directly coating the composition on a second electrode current collector (or plate). Alternatively, the negative electrode may be manufactured by casting the composition on a separate support to form a film and then laminating the film peeled off from the support on the second electrode current collector.

Examples of the negative electrode active material include lithium metal, metals that may be alloyed with lithium, transition metal oxides, materials that may be doped or undoped with lithium, and materials that allow reversible intercalation and deintercalation of lithium ions.

Examples of the transition metal oxides may include vanadium oxides and lithium vanadium oxides. Examples of the materials that may be doped or undoped with lithium may include Si, SiO, (0<x<2), a Si—Y alloy (where Y is an alkali metal, alkaline earth metal, elements of group 13 to group 16, transition metal, rare earth element, or a combination thereof, except that Y is not Si), Sn, $SnO_2$, Sn—Y (in which Y is an alkali metal, alkaline earth metal, of group 13 to group 16, transition metal, rare earth element, or a combination thereof, except that Y is not Sn), and a mixture of at least one of the foregoing and $SiO_2$. In some embodiments, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

The negative electrode active material included in the first electrode assembly and the second electrode assembly may be selected from natural graphite, artificial graphite, soft carbon (e.g., carbon sintered at low temperatures), hard carbon, meso-phase pitch carbides, sintered cokes, and combinations thereof. The negative electrode active material included in the first electrode assembly and the second electrode assembly may be, for example, soft carbon that is heat-treated at a temperature of 1500° C. or lower. High-rate characteristics of a secondary battery including the first and second electrode assemblies including the negative electrode active material may be improved.

In the embodiments described herein, the electrode assemblies are described as they are wound into an elliptic-cylindrical shape, but the present invention is not limited thereto and in some embodiments, an electrode assembly may be formed in a stacked structure.

The secondary battery may include a plurality of the first electrode assemblies and a plurality of the second electrode assemblies (e.g., the first electrode assembly may include a plurality of first electrode assemblies, and the second electrode may include a plurality of second electrode assemblies).

Figure 3:
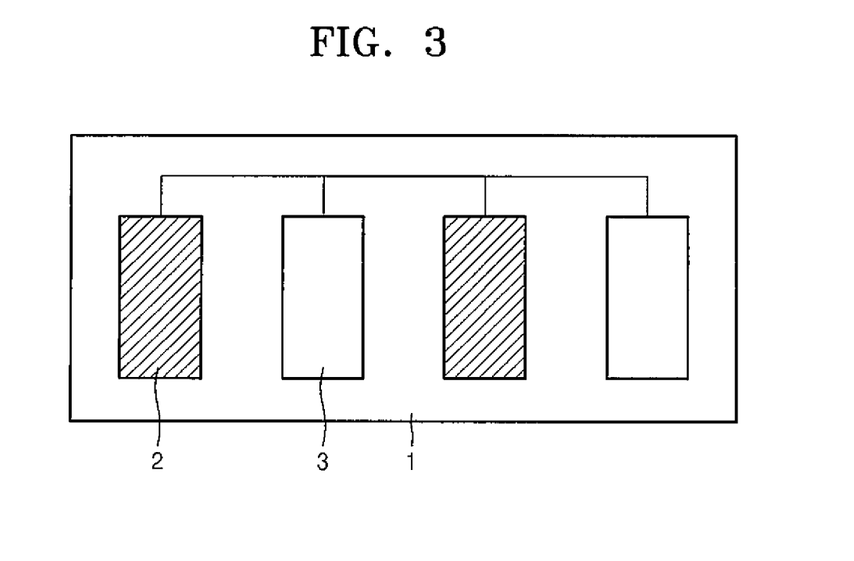
FIG. 3 is a schematic view of a connection between a plurality of first electrode assemblies and a plurality of second electrode assemblies in a secondary battery according to an embodiment of the present invention.
Figure 4:
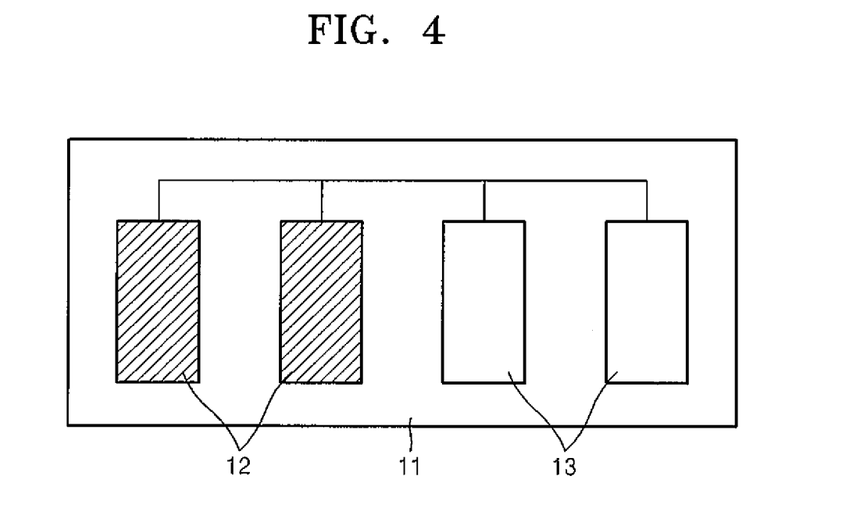
FIG. 4 is a schematic view of a connection between a plurality of first electrode assemblies and a plurality of second electrode assemblies in a secondary battery according to another embodiment of the present invention.

FIG. 3 is a schematic view of a connection between a plurality of first electrode assemblies 2 and a plurality of second electrode assemblies 3 in a secondary battery 1 according to an embodiment of the present invention. FIG. 4 is a schematic view of a connection between a plurality of first electrode assemblies 12 and a plurality of second electrode assemblies 13 in a secondary battery 11 according to another embodiment of the present invention.

Referring to FIGS. 3 and 4, the plurality of first electrode assemblies 2, 12 and the plurality of second electrode assemblies 3, 13 may be connected in parallel. Here, each of the plurality of first electrode assemblies 2, 12 and each of the plurality of second electrode assemblies 3, 13 may be connected in series or in parallel. The first and second electrode assemblies may be arranged alternatively in the secondary battery.

The secondary battery may be used in, for example, electric cars, hybrid electric cars, or plug-in hybrid electric cars. Moreover, the configuration of the plurality of the electrode assemblies may be used in an organic-based capacitor.

For example, the lithium secondary battery may be replaced by an organic-based capacitor in other embodiments.

Hereinafter, the present invention will be described in more detail referring to examples, but various changes or modifications can be carried out without departing from the spirit or scope of the present invention. Thus, all such changes or modifications will be included in the following claims.

EXAMPLE

Example 1

Manufacture of Secondary Battery

Example 1-1

Manufacture of First Electrode Assembly 90 parts by weight of a mixed powder including 85 parts by weight of a $LiCoO_2$ powder with an average particle diameter of 5 μm (available from Umicore) and 5 parts by weight of an active carbon powder with an average particle diameter of 7.5 μm (available from Kuraray), 4 parts by weight of carbon black as a conducting agent, and 6 parts by weight of polyvinylidene fluoride as a binder were dissolved in a N-methyl-pyrrolidone (NMP) solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

92 parts by weight of soft carbon (available from GS Caltex), 5 parts by weight of carbon black as a conducting agent, 1 part by weight of carboxymethylcellulose as a thickener, and 2 parts by weight of styrene-butadiene rubber as a binder were dispersed and mixed in a water solvent to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a first electrode assembly.

Example 1-2

Manufacture of Second Electrode Assembly 90 parts by weight of a mixed powder including 85 parts by weight of a LiFePO$_4$ powder with an average particle diameter of 0.47 μm (available from Phostech Lithium) and 5 parts by weight of active carbon powder with an average particle diameter of 7.5 μm (available from Kuraray), 4 parts by weight of carbon black as a conducting agent, and 6 parts by weight of polyvinylidene fluoride as a binder were dissolved in a NMP solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

92 parts by weight of soft carbon (available from GS Caltex), 5 parts by weight of carbon black as a conducting agent, 1 part by weight of carboxymethylcellulose as a thickener, and 2 parts by weight of styrene-butadiene rubber as a binder were dispersed in a NMP solvent and mixed in an agate mortar to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a second electrode assembly. Here, a discharge capacity ratio of the second electrode assembly was 35% based on a total discharge capacity of the first electrode assembly prepared in Example 1-1 and the second electrode assembly.

Example 1-3

Manufacture of Secondary Battery

The first electrode assembly prepared in Example 1-1 and the second electrode assembly prepared in Example 1-2 were connected in parallel and then mounted in a can. Next, an electrolyte in which 1.13 M LiPF$_6$ was dissolved in a solvent mixture including ethylenecarbonate (EC), dimethylene carbonate (DMC), and diethylene carbonate (DEC) at a volume ratio of 3:5:2 was injected in the can and sealed in vacuum to manufacture a secondary battery.

Example 2

Manufacture of Secondary Battery

Example 2-1

Manufacture of First Electrode Assembly 90 parts by weight of a mixed powder including 85 parts by weight of a LiCoO$_2$ powder with an average particle diameter of 5 μm (available from Umicore) and 5 parts by weight of an active carbon powder with an average particle diameter of 7.5 μm (available from Kuraray), 4 parts by weight of carbon black as a conducting agent, and 6 parts by weight of polyvinylidene fluoride as a binder were dissolved in a NMP solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

92 parts by weight of soft carbon (available from GS Caltex), 5 parts by weight of carbon black as a conducting agent, 1 part by weight of carboxymethylcellulose as a thickener, and 2 parts by weight of styrene-butadiene rubber as a binder were dispersed in a NMP solvent and mixed in an agate mortar to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a first electrode assembly.

Example 2-2

Manufacture of Second Electrode Assembly 90 parts by weight of a mixed powder including 85 parts by weight of a $LiFePO_4$ powder with an average particle diameter of 0.47 μm (available from Phostech Lithium) and 5 parts by weight of active carbon powder with an average particle diameter of 7.5 μm (available from Kuraray), 4 parts by weight of carbon black as a conducting agent, and 6 parts by weight of polyvinylidene fluoride as a binder were dissolved in a NMP solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

92 parts by weight of soft carbon (available from GS Caltex), 5 parts by weight of carbon black as a conducting agent, 1 part by weight of carboxymethylcellulose as a thickener, and 2 parts by weight of styrene-butadiene rubber as a binder were dispersed in a NMP solvent and mixed in an agate mortar to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a second electrode assembly. Here, a discharge capacity ratio of the second electrode assembly was 45% based on a total discharge capacity of the first electrode assembly prepared in Example 2-1 and the second electrode assembly.

Example 2-3

Manufacture of Secondary Battery

The first electrode assembly prepared in Example 2-1 and the second electrode assembly prepared in Example 2-2 were connected in parallel and then mounted in a can. Next, an electrolyte in which 1.13 M $LiPF_6$ was dissolved in a solvent mixture including EC, DMC, and DEC at a volume ratio of 3:5:2 was injected in the can and sealed in vacuum to manufacture a secondary battery.

Example 3

Manufacture of Secondary Battery

Example 3-1

Manufacture of First Electrode Assembly 90 parts by weight of a mixed powder including 85 parts by weight of a $LiCoO_2$ powder with an average particle diameter of 5 μm (available from Umicore) and 5 parts by weight of an active carbon powder with an average particle diameter of 7.5 μm (available from Kuraray), 4 parts by weight of carbon black as a conducting agent, and 6 parts by weight of polyvinylidene fluoride as a binder were dissolved in a NMP solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

92 parts by weight of soft carbon (available from GS Caltex), 5 parts by weight of carbon black as a conducting agent, 1 part by weight of carboxymethylcellulose as a thickener, and 2 parts by weight of styrene-butadiene rubber as a binder were dispersed in a NMP solvent and mixed in an agate mortar to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a first electrode assembly.

Example 3-2

Manufacture of Second Electrode Assembly 90 parts by weight of a mixed powder including 85 parts by weight of a $LiFePO_4$ powder with an average particle diameter of 0.47 μm (available from Phostech Lithium) and 5 parts by weight of active carbon powder with an average particle diameter of 7.5 μm (available from Kuraray), 4 parts by weight of carbon black as a conducting agent, and 6 parts by weight of polyvinylidene fluoride as a binder were dissolved in a NMP solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

92 parts by weight of soft carbon (available from GS Caltex), 5 parts by weight of carbon black as a conducting agent, 1 part by weight of carboxymethylcellulose as a thickener, and 2 parts by weight of styrene-butadiene rubber as a binder were dispersed in a NMP solvent and mixed in an agate mortar to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a second electrode assembly. Here, a discharge capacity ratio of the second electrode assembly was 75% based on a total discharge capacity of the first electrode assembly prepared in Example 3-1 and the second electrode assembly.

Example 3-3

Manufacture of Secondary Battery

The first electrode assembly prepared in Example 3-1 and the second electrode assembly prepared in Example 3-2 were connected in parallel and then mounted in a can. Next, an electrolyte in which 1.13 M $LiPF_6$ was dissolved in a solvent mixture including EC, DMC, and DEC at a volume ratio of 3:5:2 was injected in the can and sealed in vacuum to manufacture a secondary battery.

Comparative Example 1

Manufacture of Secondary Battery

Comparative Example 1-1

Manufacture of a First Electrode Assembly 90 parts by weight of a mixed powder including 85 parts by weight of a $LiFePO_4$ powder with an average particle diameter of 0.47 μm (available from Phostech Lithium) and 5 parts by weight of an active carbon powder with an average particle diameter of 5 μm (available from Kuraray), 4 parts by weight of carbon black as a conducting agent, and 10 parts by weight of polyvinylidene fluoride as a binder were dissolved in a NMP solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

92 parts by weight of soft carbon (available from GS Caltex), 5 parts by weight of carbon black as a conducting agent, 1 part by weight of carboxymethylcellulose as a thickener, and 2 parts by weight of styrene-butadiene rubber as a binder were dispersed in a NMP solvent and mixed in an agate mortar to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a first electrode assembly.

Comparative Example 1-2

Manufacture of Second Electrode Assembly 90 parts by weight of a mixed powder including 85 parts by weight of a $LiFePO_4$ powder with an average particle diameter of 0.47 μm (available from Phostech Lithium) and 5 parts by weight of active carbon powder with an average particle diameter of 7.5 μm (available from Kuraray), 4 parts by weight of carbon black as a conducting agent, and 6 parts by weight of polyvinylidene fluoride as a binder were dissolved in a NMP solvent to prepare a positive electrode active material composition slurry. The slurry was coated on an aluminum current collector at a thickness of about 145 μm by using a doctor blade (gap: 170 mm) and then heat-treated and dried in vacuum at a temperature of 100° C. for 5.5 hours. Then, the aluminum current collector coated with the slurry was rolled by using a roll press to prepare a positive electrode plate including a positive electrode active material layer. The positive electrode plate was cut to prepare a positive electrode in a rectangular shape with a size of 457 mm×70.0 mm.

98 parts by weight of soft carbon (available from GS Caltex), 1 part by weight of carboxymethylcellulose as a thickener, and 1 part by weight of styrene-butadiene rubber as a binder were dispersed in a NMP solvent and mixed in an agate mortar to prepare a negative electrode active material composition slurry. The slurry was coated on a copper current collector at a thickness of about 140 μm by using a doctor blade (gap: 160 mm) and then heat-treated and dried in a vacuum oven at a temperature of 145° C. for 6.5 hours. Then, the copper current collector coated with the slurry was rolled by using a roll press to prepare a negative electrode plate including a negative electrode active material layer. The negative electrode plate was cut to prepare a negative electrode in a rectangular shape with a size of 448 mm×70.0 mm.

A polyethylene separator was disposed between the positive electrode and the negative electrode, and then rolled into a shape of a cylindrical-pillar (e.g., an elliptic-cylindrical shape) to manufacture a second electrode assembly.

Comparative Example 1-3

Manufacture of Secondary Battery

The first electrode assembly prepared in Comparative Example 1-1 and the second electrode assembly prepared in Comparative Example 1-2 were connected in parallel and then mounted in a can. Next, an electrolyte in which 1.13 M LiPF$_6$ was dissolved in a solvent mixture including EC, DMC, and DEC at a volume ratio of 3:5:2 was injected in the can and sealed in vacuum to manufacture a secondary battery.

Evaluation Example 1

Self-Discharge Characteristics Evaluation 2 times of formation charging and discharging at room temperature were performed on the secondary batteries prepared in Examples 1 to 3 and Comparative Example 1. In the formation process, constant current charging was performed on the secondary batteries at a constant current of 0.2 C up to 4.0 V, and then constant current discharging was performed on the secondary batteries at 0.2 C to 2.0 V. Then the secondary batteries, after the formation charging and discharging process, were charged in the same manner described above at 1 C and then were discharged at 1 C to 2.0 V. The charging and discharging condition used here was determined as a standard charging and discharging condition, and the discharge capacity used here was determined as a standard capacity.

Figure 5:
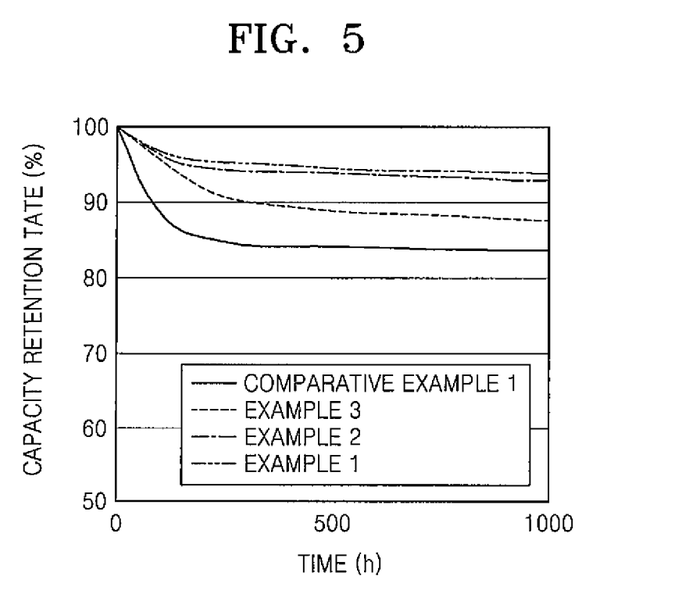
FIG. 5 is a graph of self discharge characteristics of secondary batteries manufactured according to Examples 1 to 3 and Comparative Example 1 after maintaining them for 40 days at room temperature (25° C.)

Subsequently, the secondary batteries were left at room temperature for about 40 days to obtain discharge capacity values before and after being left for about 40 days, and thus a capacity retention rate (%) of Equation 1 was calculated therefrom. The results are shown in FIG. 5 and Table 1 below.

Capacity retention rate (%)=[Discharge capacity after being left for about 40 days/standard capacity]×100     Equation 1

TABLE 1

|  | Standard capacity (mAh) | Discharge capacity after being left for about 40 days (mAh) | Capacity retention rate (%) |
|---|---|---|---|
| Example 1 | 122 | 114.56 | 93.9 |
| Example 2 | 121 | 112.29 | 92.8 |
| Example 3 | 117 | 102.60 | 87.1 |
| Comparative Example 1 | 115 | 95.91 | 83.4 |

Referring to Table 1 and FIG. 5, it was confirmed that the secondary batteries manufactured according to Examples 1 to 3 had excellent self-discharge characteristics compared to the secondary battery manufactured in Comparative Example 1. Particularly, self-discharge characteristics of the secondary batteries manufactured according to Examples 1 to 3 were respectively improved 12.5%, 11.2%, and 4.4% as compared to the secondary battery manufactured according to Comparative Example 1.

Evaluation Example 1

Lifetime Characteristics Evaluation

Figure 6:
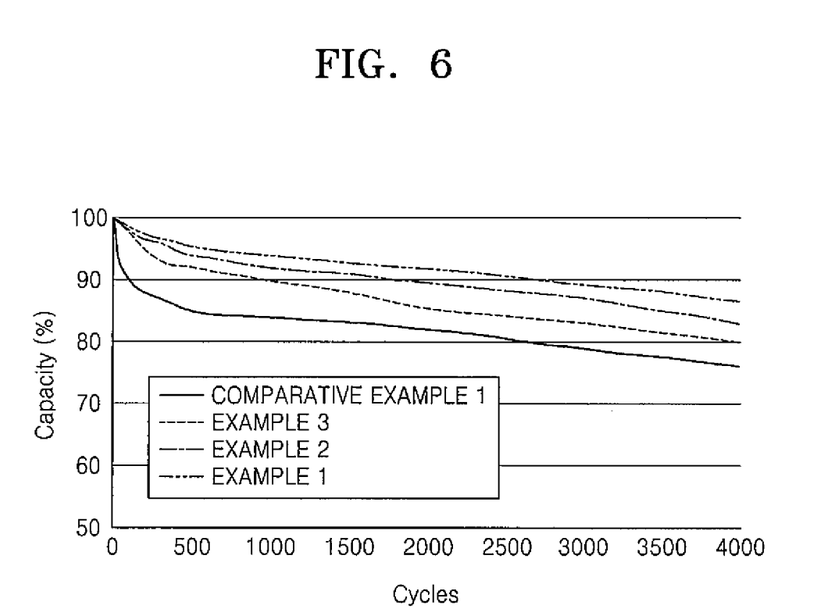
FIG. 6 is a graph of lifetime characteristics of the secondary batteries manufactured according to Examples 1 to 3 and Comparative Example 1.

The secondary batteries manufactured according to Examples 1 to 3 and Comparative Example 1, on which the formation charging and discharging were performed in the same manner as Evaluation Example 1, were charged at 1 C in the same charging manner as described above and then discharged at 1 C to 2.0 V. Then, a discharge capacity (a discharge capacity of first cycle) was measured. Such cycle of charging and discharging was repeated at 4 C to evaluate cycle lifetime of the secondary batteries. A discharge capacity after each cycle and a discharge capacity after 4000 cycles of each of the secondary batteries were measured, and thus a capacity retention rate (%) of Equation 2 was calculated therefrom. The results are shown in FIG. 6 and Table 2.

Capacity retention rate (%)=[Discharge capacity after 4000$^{th}$ cycle/discharge capacity after 1$^{st}$ cycle]×100     Equation 2

TABLE 2

|  | Discharge capacity after 1$^{st}$ cycle (mAh) | Discharge capacity after 4000$^{th}$ cycle (mAh) | Capacity retention rate (%) |
|---|---|---|---|
| Example 1 | 121 | 104.1 | 86 |
| Example 2 | 120 | 99.6 | 83 |
| Example 3 | 117 | 93.6 | 80 |
| Comparative Example 1 | 114 | 86.6 | 76 |

Referring to Table 2 and FIG. 6, it was confirmed that the secondary batteries manufactured according to Examples 1 to 3 had 4 C lifetime characteristics that are 80% or more improved than that of the secondary battery manufactured according to Comparative Example 1.

As described above, according to the one or more of the above-described embodiments of the present invention, self-discharge characteristics and lifetime characteristics of a secondary battery may be improved by including a first electrode assembly and a secondary electrode assembly that are electrically connected, having different average voltages of a first positive electrode active material and a second positive electrode active material respectively included in the first electrode assembly and the second electrode assembly, and having a discharge capacity ratio of the second electrode assembly in a range of 25% to 80% (e.g., 35% to 80%) based on a total discharge capacity of the first electrode assembly and the second electrode assembly.

It should be understood that the embodiments described herein should be considered in a descriptive sense only and not for purposes of limitation, and the invention is intended to cover various modifications and equivalent arrangements included within the spirit and scope of the appended claims, and equivalents thereof. Descriptions of features or aspects within each embodiment should typically be considered as available for other similar features or aspects in other embodiments.

What is claimed is:

1. An energy storage device, the energy storage device comprising a plurality of electrode assemblies comprising:
    a first electrode assembly comprising a first positive electrode active material; and
    a second electrode assembly comprising a second positive electrode active material,
    wherein the first electrode assembly and the second electrode assembly are electrically connected to each other in parallel,
    wherein the first positive electrode active material is different from the second positive electrode active material, wherein at least one of the first positive electrode active material and the second positive electrode active material comprises a third positive electrode active material comprising active carbon, wherein the third positive electrode active material is present in an amount in a range of 0.1 parts to 10 parts by weight, based on 100 parts by weight of the first positive electrode active material and the second positive electrode active material, wherein a discharge capacity ratio of the second electrode assembly being in a range of 25% to 80%, based on a total discharge capacity of the first electrode assembly and the second electrode assembly, and wherein a capacity retention rate of the energy storage device is in a range of about 87.1% to about 93.9%, the capacity retention rate being equal to a discharge capacity of the energy storage device after being left at room temperature for about 40days divided by a standard capacity of the energy storage device.

2. The energy storage device of claim 1, wherein the discharge capacity ratio of the second electrode assembly is in a range of 35% to 75%, based on the total discharge capacity of the first electrode assembly and the second electrode assembly.

3. The energy storage device of claim 1, wherein a ratio of a discharge capacity of the second electrode assembly to a discharge capacity of the first electrode assembly is in a range of 3:1 to 1:3.

4. The energy storage device of claim 1, wherein an average voltage of the first positive electrode active material is different from an average voltage of the second positive electrode active material.

5. The energy storage device of claim 4, wherein the average voltage of the second positive electrode active material is lower than the average voltage of the first positive electrode active material.

6. The energy storage device of claim 1, wherein the second positive electrode active material comprises a compound represented by Formula 1:

Formula 1

M being selected from the group consisting of Fe, Mn, Ni, Co, and combinations thereof, M' being selected from the group consisting of Mg, Ca, Sr, Ba, Ti, Zr, Nb, Mo, W, Zn, Al, Si, and combinations thereof, X being selected from the group consisting of S, F, and a combination thereof, and $0.55 \leq x \leq 1.5$, $0 < y \leq 1$, $0 \leq z \leq 1$, and $0 \leq w \leq 0.2$.

7. The energy storage device of claim 1, wherein the first positive electrode active material comprises a compound represented by Formula 2:

Formula 2

M" being selected from the group consisting of Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc, Y, rare earth elements, and combinations thereof, X' being selected from the group consisting of F, S, P, and combinations thereof, and $0.5 \leq a \leq 1.5$, $0 \leq b \leq 0.5$, $0 \leq c \leq 0.5$, and $0 \leq d \leq 0.5$.

8. The energy storage device of claim 1, wherein a first positive electrode of the first electrode assembly comprises the first positive electrode active material and a second positive electrode of the second electrode assembly comprises the second positive electrode active material, and at least one of the first positive electrode and the second positive electrode further comprises a conducting agent and a binder.

9. The energy storage device of claim 1, wherein each of the first electrode assembly and the second electrode assembly comprises a negative electrode active material selected from the group consisting of natural graphite, artificial graphite, soft carbon, hard carbon, meso-phase pitch carbides, sintered cokes, and combinations thereof.

10. The energy storage device of claim 9, wherein each of the first electrode assembly and the second electrode assembly comprises a negative electrode active material comprising soft carbon heat-treated at a temperature of 1500° C. or lower.

11. The energy storage device of claim 1, wherein the first electrode assembly comprises a plurality of first electrode assemblies, and the second electrode assembly comprises a plurality of second electrode assemblies.

12. The energy storage device of claim 11, wherein the plurality of first electrode assemblies and the plurality of second electrode assemblies are electrically connected in parallel.

13. The energy storage device of claim 11, wherein the plurality of first electrode assemblies are electrically connected to one another in series or parallel, and the plurality of second electrode assemblies are electrically connected to one another in series or parallel.

14. The energy storage device of claim 11, wherein the first electrode assemblies are arranged alternately with the second electrode assemblies.

15. The energy storage device of claim 1, wherein the energy storage device is an organic-based capacitor.

16. An electric vehicle comprising the energy storage device of claim 1.

17. A hybrid vehicle comprising the energy storage device of claim 1.

* * * * *

UNITED STATES PATENT AND TRADEMARK OFFICE
CERTIFICATE OF CORRECTION

PATENT NO. : 9,583,279 B2  Page 1 of 2
APPLICATION NO. : 14/065362
DATED : February 28, 2017
INVENTOR(S) : Dae-Seop Lim et al.

It is certified that error appears in the above-identified patent and that said Letters Patent is hereby corrected as shown below:

In the Drawings

Replace sheet 4 of 4 with attached sheet 4 of 4

In the Claims

Column 19, Line 18, Claim 1, delete "40days" and insert -- 40 days --

Column 19, Line 49, Claim 6, delete "$0.55 \leq x \leq 1.5$," and insert -- $0.5 \leq x \leq 1.5$ --

Signed and Sealed this
Nineteenth Day of February, 2019

Andrei Iancu
*Director of the United States Patent and Trademark Office*

FIG. 5

FIG. 6